(12) United States Patent
Bulusu et al.

(10) Patent No.: US 8,982,733 B2
(45) Date of Patent: Mar. 17, 2015

(54) SYSTEM AND METHOD FOR MANAGING TOPOLOGY CHANGES IN A NETWORK ENVIRONMENT

(75) Inventors: Shekher Bulusu, Fremont, CA (US); Sanjay Sane, Fremont, CA (US); Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 534 days.

(21) Appl. No.: 13/041,148

(22) Filed: Mar. 4, 2011

(65) Prior Publication Data
US 2012/0224510 A1 Sep. 6, 2012

(51) Int. Cl.
H04L 12/28 (2006.01)
H04L 12/753 (2013.01)
H04L 12/751 (2013.01)

(52) U.S. Cl.
CPC ............... *H04L 45/48* (2013.01); *H04L 45/02* (2013.01)
USPC ........... 370/256; 370/352; 370/389; 370/390; 370/401

(58) Field of Classification Search
USPC .................................. 370/241–242, 254–256
See application file for complete search history.

(56) References Cited

U.S. PATENT DOCUMENTS

| | | |
|---|---|---|
| 4,006,320 A | 2/1977 | Markl |
| 4,486,877 A | 12/1984 | Turner |
| 4,569,042 A | 2/1986 | Larson |
| 4,630,268 A | 12/1986 | Rodenbaugh |
| 4,907,277 A | 3/1990 | Callens et al. |
| 5,010,544 A | 4/1991 | Chang et al. |
| 5,014,265 A | 5/1991 | Hahne et al. |
| 5,121,382 A | 6/1992 | Yang et al. |
| 5,159,592 A | 10/1992 | Perkins |
| 5,243,342 A | 9/1993 | Kattemalalavadi et al. |
| 5,265,092 A | 11/1993 | Soloway et al. |
| 5,274,643 A | 12/1993 | Fisk |
| 5,321,694 A | 6/1994 | Chang et al. |
| 5,341,477 A | 8/1994 | Pitkin et al. |
| 5,343,461 A | 8/1994 | Barton et al. |
| 5,353,283 A | 10/1994 | Tsuchiya |
| 5,371,852 A | 12/1994 | Attanasio et al. |
| 5,394,402 A | 2/1995 | Ross |
| 5,416,842 A | 5/1995 | Ariz |

(Continued)

FOREIGN PATENT DOCUMENTS

| | | |
|---|---|---|
| WO | WO 2008/010918 | 1/2008 |
| WO | WO 2009/014967 | 1/2009 |

OTHER PUBLICATIONS

U.S. Appl. No. 13/152,300, filed Jun. 2, 2011, entitled "System and Method for Managing Network Traffic Disruption," Inventor(s): Shekher Bulusu, et al.

(Continued)

*Primary Examiner* — Ayaz Sheikh
*Assistant Examiner* — Mounir Moutaouakil
(74) *Attorney, Agent, or Firm* — Patent Capital Group (57) ABSTRACT

A method is provided in one example embodiment and includes receiving a spanning tree protocol topology change notification (STP TCN) in a network; removing topology data for a first plurality of gateways associated with a first network segment ID that is shared by a particular gateway that communicated the STP TCN; and communicating an edge TCN to a second plurality of gateways associated with a second network segment ID and for which topology data has not been removed based on the STP TCN.

19 Claims, 8 Drawing Sheets

(56) References Cited

U.S. PATENT DOCUMENTS

| | | |
|---|---|---|
| 5,422,876 A | 6/1995 | Turudic |
| 5,426,637 A | 6/1995 | Derby et al. |
| 5,430,715 A | 7/1995 | Corbalis et al. |
| 5,430,727 A | 7/1995 | Callon |
| 5,450,394 A | 9/1995 | Gruber |
| 5,450,449 A | 9/1995 | Kroon |
| 5,452,294 A | 9/1995 | Natarajan |
| 5,459,837 A | 10/1995 | Caccavale |
| 5,473,599 A | 12/1995 | Li et al. |
| 5,477,531 A | 12/1995 | McKee et al. |
| 5,491,692 A | 2/1996 | Gunner et al. |
| 5,500,851 A | 3/1996 | Kozaki et al. |
| 5,500,860 A | 3/1996 | Perlman et al. |
| 5,509,123 A | 4/1996 | Dobbins et al. |
| 5,519,704 A | 5/1996 | Farinacci et al. |
| 5,521,907 A | 5/1996 | Ennis et al. |
| 5,555,256 A | 9/1996 | Calamvokis |
| 5,561,669 A | 10/1996 | Lenny et al. |
| 5,563,875 A | 10/1996 | Hefel et al. |
| 5,594,732 A | 1/1997 | Bell et al. |
| 5,602,918 A | 2/1997 | Chen et al. |
| 5,604,803 A | 2/1997 | Aziz |
| 5,617,417 A | 4/1997 | Sathe et al. |
| 5,617,421 A | 4/1997 | Chin et al. |
| 5,621,721 A | 4/1997 | Vatuone |
| 5,623,492 A | 4/1997 | Teraslinna |
| 5,623,605 A | 4/1997 | Keshav et al. |
| 5,642,515 A | 6/1997 | Jones et al. |
| 5,650,993 A | 7/1997 | Lakshman et al. |
| 5,651,002 A | 7/1997 | Van Seters et al. |
| 5,659,542 A | 8/1997 | Bell et al. |
| 5,673,265 A | 9/1997 | Gupta et al. |
| 5,675,741 A | 10/1997 | Aggarwal et al. |
| 5,689,566 A | 11/1997 | Nguyen |
| 5,699,478 A | 12/1997 | Nahumi |
| 5,699,485 A | 12/1997 | Shoham |
| 5,708,502 A | 1/1998 | Denton et al. |
| 5,715,399 A | 2/1998 | Bezos |
| 5,740,171 A | 4/1998 | Mazzola et al. |
| 5,740,176 A | 4/1998 | Gupta et al. |
| 5,742,604 A | 4/1998 | Edsall et al. |
| 5,764,636 A | 6/1998 | Edsall |
| 5,793,763 A | 8/1998 | Mayes et al. |
| 5,812,528 A | 9/1998 | VanDervort |
| 5,819,089 A | 10/1998 | White |
| 5,835,494 A | 11/1998 | Hughes et al. |
| 5,838,994 A | 11/1998 | Valizadeh |
| 5,850,388 A | 12/1998 | Anderson et al. |
| 5,867,666 A | 2/1999 | Harvey |
| 5,870,397 A | 2/1999 | Chauffour et al. |
| 5,870,557 A | 2/1999 | Bellovin et al. |
| 5,884,010 A | 3/1999 | Chen et al. |
| 5,894,556 A | 4/1999 | Grimm et al. |
| 5,905,871 A | 5/1999 | Buskens et al. |
| 5,917,820 A | 6/1999 | Rekhter |
| 5,918,017 A | 6/1999 | Attanasio et al. |
| 5,918,019 A | 6/1999 | Valencia |
| 5,931,961 A | 8/1999 | Ranganathan et al. |
| 5,943,347 A | 8/1999 | Shepard |
| 5,983,265 A | 11/1999 | Martino, II |
| 5,987,011 A | 11/1999 | Toh |
| 5,991,809 A | 11/1999 | Kriegsman |
| 6,003,079 A | 12/1999 | Friedrich et al. |
| 6,006,264 A | 12/1999 | Colby et al. |
| 6,009,081 A | 12/1999 | Wheeler et al. |
| 6,018,516 A | 1/2000 | Packer |
| 6,023,455 A | 2/2000 | Takahashi |
| 6,023,733 A | 2/2000 | Periasamy et al. |
| 6,031,846 A | 2/2000 | Gurusami et al. |
| 6,032,194 A | 2/2000 | Gai et al. |
| 6,041,352 A | 3/2000 | Burdick et al. |
| 6,061,454 A | 5/2000 | Malik et al. |
| 6,070,190 A | 5/2000 | Reps et al. |
| 6,078,590 A | 6/2000 | Farinacci et al. |
| 6,078,956 A | 6/2000 | Bryant et al. |
| 6,088,717 A | 7/2000 | Reed et al. |
| 6,094,562 A | 7/2000 | Zhong |
| 6,101,180 A | 8/2000 | Donahue et al. |
| 6,104,695 A | 8/2000 | Wesley et al. |
| 6,115,711 A | 9/2000 | White |
| 6,115,752 A | 9/2000 | Chauhan |
| 6,118,765 A | 9/2000 | Phillips |
| 6,118,796 A | 9/2000 | Best et al. |
| 6,185,203 B1 | 2/2001 | Berman |
| 6,192,036 B1 | 2/2001 | Buhler et al. |
| 6,230,271 B1 | 5/2001 | Wadlow et al. |
| 6,252,851 B1 | 6/2001 | Siu et al. |
| 6,275,471 B1 | 8/2001 | Bushmitch et al. |
| 6,278,687 B1 | 8/2001 | Hunneyball |
| 6,286,045 B1 | 9/2001 | Griffiths et al. |
| 6,317,775 B1 | 11/2001 | Coile et al. |
| 6,337,861 B1 | 1/2002 | Rosen |
| 6,356,545 B1 | 3/2002 | Vargo et al. |
| 6,363,477 B1 | 3/2002 | Fletcher et al. |
| 6,389,006 B1 | 5/2002 | Bialik |
| 6,445,717 B1 | 9/2002 | Gibson et al. |
| 6,446,121 B1 | 9/2002 | Shah et al. |
| 6,510,150 B1 | 1/2003 | Ngo |
| 6,515,967 B1 | 2/2003 | Wei et al. |
| 6,526,044 B1 | 2/2003 | Cookmeyer et al. |
| 6,535,490 B1 | 3/2003 | Jain |
| 6,563,796 B1 | 5/2003 | Saito |
| 6,578,066 B1 | 6/2003 | Logan et al. |
| 6,584,438 B1 | 6/2003 | Manjunath et al. |
| 6,614,781 B1 | 9/2003 | Elliott et al. |
| 6,628,624 B1 | 9/2003 | Mahajan et al. |
| 6,665,637 B2 | 12/2003 | Bruhn |
| 6,680,921 B1 | 1/2004 | Svanbro et al. |
| 6,687,225 B1 | 2/2004 | Kawarai et al. |
| 6,687,360 B2 | 2/2004 | Kung et al. |
| 6,700,874 B1 | 3/2004 | Takihiro et al. |
| 6,725,191 B2 | 4/2004 | Mecayten |
| 6,731,609 B1 | 5/2004 | Hirni et al. |
| 6,741,600 B1 | 5/2004 | Weiss et al. |
| 6,757,654 B1 | 6/2004 | Westerlund et al. |
| 6,765,881 B1 | 7/2004 | Rajakarunanayake |
| 6,775,703 B1 | 8/2004 | Burns et al. |
| 6,785,261 B1 | 8/2004 | Schuster et al. |
| 6,798,739 B1 | 9/2004 | Lee |
| 6,804,244 B1 | 10/2004 | Anandakumar et al. |
| 6,836,804 B1 | 12/2004 | Jagadeesan |
| 6,839,353 B1 | 1/2005 | DeJager |
| 6,845,091 B2 | 1/2005 | Ogier et al. |
| 6,901,048 B1 | 5/2005 | Wang et al. |
| 6,917,983 B1 | 7/2005 | Li |
| 6,940,821 B1 | 9/2005 | Wei et al. |
| 6,944,132 B1 | 9/2005 | Aono et al. |
| 6,947,381 B2 | 9/2005 | Wen et al. |
| 7,013,267 B1 | 3/2006 | Huart et al. |
| 7,024,257 B2 | 4/2006 | Pearce et al. |
| 7,039,716 B1 | 5/2006 | Jagadeesan |
| 7,047,190 B1 | 5/2006 | Kapilow |
| 7,068,607 B2 | 6/2006 | Paratain et al. |
| 7,069,034 B1 | 6/2006 | Sourour |
| 7,072,968 B2 | 7/2006 | Mikami et al. |
| 7,099,820 B1 | 8/2006 | Huart et al. |
| 7,133,368 B2 | 11/2006 | Zhang et al. |
| 7,143,184 B1 | 11/2006 | Shah et al. |
| 7,212,517 B2 | 5/2007 | Dzik |
| 7,283,474 B1 | 10/2007 | Bergenwall |
| 7,286,467 B1 | 10/2007 | Sylvain |
| 7,289,454 B2 | 10/2007 | Bovo et al. |
| 7,310,334 B1 | 12/2007 | FitzGerald et al. |
| 7,336,620 B2 | 2/2008 | Bennett |
| 7,352,700 B2 | 4/2008 | Chan et al. |
| 7,352,705 B1 | 4/2008 | Adhikari et al. |
| 7,406,034 B1 | 7/2008 | Cometto et al. |
| 7,417,993 B1 | 8/2008 | Ebergen et al. |
| 7,426,577 B2 | 9/2008 | Bardzil et al. |
| 7,457,877 B1 | 11/2008 | Shah et al. |
| 7,483,370 B1 | 1/2009 | Dayal et al. |
| 7,496,044 B1 | 2/2009 | Wing |
| 7,519,006 B1 | 4/2009 | Wing |
| 7,525,949 B1 | 4/2009 | Rampal et al. |

(56) References Cited

U.S. PATENT DOCUMENTS

| | | | |
|---|---|---|---|
| 7,564,858 B1 | 7/2009 | Moncada-Elias et al. | |
| 7,643,430 B2 | 1/2010 | Morandin | |
| 7,660,314 B2 | 2/2010 | Wybenga et al. | |
| 7,672,227 B2 | 3/2010 | Santoso et al. | |
| 7,729,267 B2 | 6/2010 | Oran et al. | |
| 7,752,037 B2 | 7/2010 | Chen et al. | |
| 7,817,580 B2 | 10/2010 | Jain et al. | |
| 7,864,712 B2 | 1/2011 | Khan et al. | |
| 7,870,611 B2 | 1/2011 | Ishikawa | |
| 7,886,080 B2 * | 2/2011 | Sajassi et al. | 709/242 |
| 7,944,470 B2 | 5/2011 | Foster et al. | |
| 7,969,894 B2 | 6/2011 | Mangal | |
| 8,065,317 B2 | 11/2011 | Wang et al. | |
| 8,077,633 B2 | 12/2011 | Jain | |
| 8,116,213 B2 | 2/2012 | Krygowski | |
| 8,174,996 B2 | 5/2012 | Omar | |
| 8,244,909 B1 | 8/2012 | Hanson et al. | |
| 8,291,077 B2 | 10/2012 | I'Anson | |
| 8,582,467 B2 | 11/2013 | Hirota et al. | |
| 2002/0003775 A1 | 1/2002 | Nakano et al. | |
| 2002/0067693 A1 | 6/2002 | Kodialam et al. | |
| 2002/0073375 A1 | 6/2002 | Hollander | |
| 2002/0083186 A1 | 6/2002 | Stringer | |
| 2002/0196802 A1 | 12/2002 | Sakov et al. | |
| 2003/0053419 A1 | 3/2003 | Kanazawa et al. | |
| 2003/0072269 A1 | 4/2003 | Teruhi et al. | |
| 2003/0097438 A1 | 5/2003 | Bearden et al. | |
| 2003/0110276 A1 | 6/2003 | Riddle | |
| 2003/0137972 A1 | 7/2003 | Kowalewski et al. | |
| 2003/0142680 A1 | 7/2003 | Oguchi | |
| 2003/0163772 A1 | 8/2003 | Jaworski | |
| 2003/0165114 A1 | 9/2003 | Kusama et al. | |
| 2003/0208616 A1 | 11/2003 | Laing et al. | |
| 2003/0219022 A1 | 11/2003 | Dillon et al. | |
| 2003/0220971 A1 | 11/2003 | Kressin | |
| 2003/0225549 A1 | 12/2003 | Shay | |
| 2004/0008715 A1 | 1/2004 | Barrack et al. | |
| 2004/0052257 A1 | 3/2004 | Abdo et al. | |
| 2004/0073690 A1 | 4/2004 | Hepworth et al. | |
| 2004/0114539 A1 | 6/2004 | Beshai et al. | |
| 2004/0125965 A1 | 7/2004 | Alberth et al. | |
| 2004/0170163 A1 | 9/2004 | Yik et al. | |
| 2004/0184323 A1 | 9/2004 | Mori et al. | |
| 2004/0193709 A1 | 9/2004 | Selvaggi et al. | |
| 2004/0218617 A1 | 11/2004 | Sagfors | |
| 2004/0223458 A1 | 11/2004 | Gentle | |
| 2004/0240431 A1 | 12/2004 | Makowski et al. | |
| 2004/0252646 A1 | 12/2004 | Adhikari et al. | |
| 2005/0036519 A1 | 2/2005 | Balakrishnan et al. | |
| 2005/0105474 A1 | 5/2005 | Metzler | |
| 2005/0111487 A1 | 5/2005 | Matta et al. | |
| 2005/0117576 A1 | 6/2005 | McDysan et al. | |
| 2005/0152406 A2 | 7/2005 | Chauveau | |
| 2005/0216599 A1 | 9/2005 | Anderson et al. | |
| 2005/0220123 A1 | 10/2005 | Wybenga et al. | |
| 2005/0226172 A1 | 10/2005 | Richardson et al. | |
| 2005/0243733 A1 | 11/2005 | Crawford et al. | |
| 2005/0246041 A1 | 11/2005 | Kreifeldt et al. | |
| 2005/0259597 A1 | 11/2005 | Benedetto et al. | |
| 2005/0265356 A1 | 12/2005 | Kawarai et al. | |
| 2005/0283639 A1 | 12/2005 | Le Pennec et al. | |
| 2005/0286419 A1 | 12/2005 | Joshi et al. | |
| 2005/0286436 A1 | 12/2005 | Flask | |
| 2006/0007869 A1 | 1/2006 | Hirota et al. | |
| 2006/0018333 A1 | 1/2006 | Windisch et al. | |
| 2006/0041431 A1 | 2/2006 | Maes | |
| 2006/0098586 A1 | 5/2006 | Farrell et al. | |
| 2006/0104217 A1 | 5/2006 | Lehane | |
| 2006/0104306 A1 | 5/2006 | Adamczyk et al. | |
| 2006/0112400 A1 | 5/2006 | Zhang et al. | |
| 2006/0122835 A1 | 6/2006 | Huart et al. | |
| 2006/0133286 A1 * | 6/2006 | Elie-Dit-Cosaque et al. | 370/249 |
| 2006/0140136 A1 | 6/2006 | Filsfils et al. | |
| 2006/0159029 A1 | 7/2006 | Samuels et al. | |
| 2006/0179338 A1 | 8/2006 | Sumner | |
| 2006/0215684 A1 | 9/2006 | Capone | |
| 2006/0250967 A1 | 11/2006 | Miller et al. | |
| 2006/0268742 A1 | 11/2006 | Chu et al. | |
| 2006/0274760 A1 | 12/2006 | Loher | |
| 2006/0280130 A1 | 12/2006 | Nomura et al. | |
| 2006/0291385 A1 | 12/2006 | Yang | |
| 2007/0041335 A1 | 2/2007 | Znamova et al. | |
| 2007/0058571 A1 | 3/2007 | Rose | |
| 2007/0064616 A1 | 3/2007 | Miranda | |
| 2007/0107034 A1 | 5/2007 | Gotwals | |
| 2007/0127395 A1 | 6/2007 | Jain et al. | |
| 2007/0150480 A1 | 6/2007 | Hwang et al. | |
| 2007/0153774 A1 | 7/2007 | Shay et al. | |
| 2007/0171835 A1 | 7/2007 | Gobara et al. | |
| 2007/0204017 A1 | 8/2007 | Maes | |
| 2007/0212065 A1 | 9/2007 | Shin et al. | |
| 2007/0223462 A1 | 9/2007 | Hite et al. | |
| 2007/0258359 A1 | 11/2007 | Ogasawara et al. | |
| 2007/0263554 A1 | 11/2007 | Finn | |
| 2007/0286165 A1 | 12/2007 | Chu et al. | |
| 2008/0019282 A1 | 1/2008 | Alaria et al. | |
| 2008/0031149 A1 | 2/2008 | Hughes et al. | |
| 2008/0031154 A1 * | 2/2008 | Niazi et al. | 370/254 |
| 2009/0022069 A1 | 1/2009 | Khan et al. | |
| 2009/0028044 A1 | 1/2009 | Windisch et al. | |
| 2009/0059800 A1 * | 3/2009 | Mohan | 370/241.1 |
| 2009/0080334 A1 | 3/2009 | DeCusatis et al. | |
| 2009/0125595 A1 | 5/2009 | Maes | |
| 2009/0144403 A1 * | 6/2009 | Sajassi et al. | 709/223 |
| 2009/0175274 A1 | 7/2009 | Aggarwal et al. | |
| 2009/0193057 A1 | 7/2009 | Maes | |
| 2009/0201937 A1 | 8/2009 | Bragg et al. | |
| 2009/0219823 A1 | 9/2009 | Qian et al. | |
| 2009/0219836 A1 | 9/2009 | Khan et al. | |
| 2009/0274153 A1 | 11/2009 | Kuo et al. | |
| 2009/0296588 A1 | 12/2009 | Nishi et al. | |
| 2009/0328051 A1 | 12/2009 | Maes | |
| 2010/0049826 A1 | 2/2010 | Maes | |
| 2010/0061254 A1 | 3/2010 | Thottakkara et al. | |
| 2010/0061269 A1 | 3/2010 | Banerjee et al. | |
| 2010/0069052 A1 | 3/2010 | Ahomaki et al. | |
| 2010/0182937 A1 * | 7/2010 | Bellagamba | 370/256 |
| 2010/0189118 A1 | 7/2010 | Nonaka | |
| 2010/0226244 A1 | 9/2010 | Mizutani et al. | |
| 2010/0302936 A1 | 12/2010 | Jan et al. | |
| 2011/0019678 A1 | 1/2011 | Mehta et al. | |
| 2011/0134804 A1 | 6/2011 | Maes | |
| 2012/0106339 A1 | 5/2012 | Mishra et al. | |

OTHER PUBLICATIONS

U.S. Appl. No. 13/077,828, filed Mar. 31, 2011 entitled "System and Method for Probing Multiple Paths in a Network Environment," Inventor(s): Hariharan Balasubramanian, et al.

U.S. Appl. No. 13/160,957, filed Jun. 15, 2011, entitled "System and Method for Providing a Loop Free Topology in a Network Environment," Inventor(s): Shekher Bulusu, et al.

USPTO Sep. 25, 2012 Non-Final Office Action from U.S. Appl. No. 12/941,881.

USPTO Dec. 11, 2012 Response to Sep. 25, 2012 Non-Final Office Action from U.S. Appl. No. 12/941,881.

USPTO 2012-26 Final Office Action from U.S. Appl. No. 12/941,881.

USPTO Mar. 26, 2013 Non-Final Office Action from U.S. Appl. No. 13/077,828.

USPTO Nov. 26, 2012 Non-Final Office Action from U.S. Appl. No. 12/938,237.

USPTO Feb. 22, 2013 Response to Nov. 26, 2012 Non-Final Office Action from U.S. Appl. No. 12/938,237.

USPTO Mar. 26, 2013 Final Office Action from U.S. Appl. No. 12/938,237.

USPTO Jan. 7, 2013 Non-Final Office Action from U.S. Appl. No. 13/160,957.

USPTO Apr. 2, 2013 Response to Non-Final Office Action dated Jan. 7, 2013 from U.S. Appl. No. 13/160,957.

Andreasan et al., "RTP No-Op Payload Format," Internet Draft <draft-wing-avt-rtp-noop-00.txt>, Internet Engineering Task Force, Feb. 2004, pp. 1-8.

(56) References Cited

OTHER PUBLICATIONS

Cheng, Jin et al., "Fast TCP: Motivation, Architecture, Algorithms, Performance," IEEE INFOCOM 2004, Aug. 2, 2004, 44 pages.
Fedyk, D., et al., ""ISIS Extensions Supporting IEEE 802.1aq Shortest Path Bridging, Network Working Group Internet Draft, Mar. 8, 2011, 42 pages; http://tools.ietf.org/html/draft-ietf-isis-ieee-aq-05.
IEEE Standards Departent, "Virtual Bridged Local Area Networks—Amendment 9: Shortest Path Bridging—IEEE P802.1aq/D2.1," © 2009, Institute of Electrical and Electronics Engineers, Inc., Aug. 21, 2009; 208 pages.
Niccolini, S., et al. "How to store traceroute measurements and related metrics," Internet Draft draft-niccolini-ippm-storetraceroutes-02.txe., Oct. 24, 2005.
Woundy et al., "ARIS: Aggregate Route-Based IP Switching," Internet Draft draft-woundy-aris-ipswitching-00-txt, Nov. 1996.
Perlman, Radia, "Rbridges: Transparent Routing," in Proc. IEEE INFOCOM, Mar. 2004.
Perlman, et al., "Rbridges: Base Protocol Specification," IETF Draft <draft-ietf-trill-rbridge-protocol-11.txt>, Jan. 2009.
Touch, et al., Transparent Interconnection of Lots of Links (TRILL): Problem and Applicability Statement, RFC 5556, IETF, May 2009.
USPTO Jul. 5, 2013 Non-Final Office Action from U.S. Appl. No. 13/152,200.
USPTO Jun. 13, 2013 RCE Response to Mar. 26, 2013 Final Office Action from U.S. Appl. No. 12/938,237.
USPTO Jul. 19, 2013 Non-Final Office Action from U.S. Appl. No. 12/938,237.
USPTO Aug. 6, 2013 RCE Response to May 8, 2013 Final Office Action from U.S. Appl. No. 13/160,957.
U.S. Appl. No. 13/152,200, filed Jun. 2, 2011, entitled "System and Method for Managing Network Traffic Disruption," Inventor(s): Shekher Bulusu, et al.
Kessler, G., "Chapter 2.2 PING of TCP: A Primer on Internet and TCP/IP Tools," RFC 1739; Dec. 1994; www.ietf.org.
Callon et al., "A Framework for Multiprotocol Label Switching," IETF Network Working Group, Internet Draft draft-ietf-mpls-framework-02.txt, Nov. 21, 1997.
Deering, S., et al., "Internet Protocol Version 6," RFC 1883, Dec. 1995.
Feldman, N., "ARIS Specification," Internet Draft, Mar. 1997.
Gobrial, Margret N., "Evaluation of Border Gateway Protocol (BGP) Version 4(V4) in the Tactical Environment," Military Communications Conference, Oct. 21-24, 1996; Abstract Only http://ieeexplore.ieee.org/xpl/login.jsp?tp=&arnumber=569372&url=http%3A%2F%2Fieeexplore.ieee.org%2Fiel3%2F4198%2F12335%2F00569372.pdf%3Farnumber%3D569372.
Halabi, Bassam, *Internet Routing Architectures* (CISCO), Macmillan Technical Publishing, Apr. 23, 1997; Abstract and Table of Contents only. http://www.ciscopress.com/store/internet-routing-architectures-cisco-9781562056520.
Handley and V. Jacobson, "SDP: Session Description Protocol," RFC 2327; Apr. 1998, 43pgs.
Heinanen, J., "Multiprotocol Encapsulation over ATM Adaptation Layer 5," RFC 1483, Jul. 1993.
Jennings, C., "NAT Classification Test Results," Internet Draft draft-jennings-behave-test-results-02draft-jennings-behave-test-results-02.txt, Jun. 25, 2006.
Katsube, Y. et al., "Toshiba's Router Architecture Extensions for ATM: Overview," RFC 2098, Feb. 1997.
Laubach, M., "Classical IP and ARP over ATM," RFC 1577, Jan. 1994.
Laubach, M., "IP over ATM Working Group's Recommendations for the ATM Forum's Multiprotocol BOF Version 1," RFC 1754, Jan. 1995.
Liao et al., "Adaptive Recovery Techniques for Real-time Audio Streams," IEEE INFOCOM2001; Twentieth Annual Joint Conference of the IEE Computer and Communications Societies Proceedings, Apr. 22-26, 2001, vol. 2, pp. 815-823.
McGovern, M., et al., "CATNIP: Common Architecture for the Internet," RFC 1707, Oct. 1994.
Nagami, K., et al., "Toshiba's Flow Attribute Notification Protocol (FANP) Specification," RFC 2129, Apr. 1997.
Newman, P. et al., "Ipsilon Flow Management Protocol Specification for IPv4 Version 1.0," RFC 1953, May 1996.
Newman, P. et al., "Ipsilon's General Switch Management Protocol Specification Version 1.1," RFC 1987, Aug. 1996.
PCT Feb. 7, 2008 International Search Report for PCT/US2007/015506.
Perez, M., et al., "ATM Signaling Support for IP over ATM," RFC 1755, Feb. 1995.
Rosen et al., "A Proposed Architecture for MPLS," IETF Network Working Group, Internet Draft draft-ietf-mpls-arch-00.txt, Aug. 1997.
Rosen et al., "MPLS Label Stock Encoding," RFC 3032, Jan. 2001.
Rosenberg et al., "STUN—Simple Traversal of User Datagram Protocol (UDP) Through Network Address Translators (NATs)," Network Working Group, RFC 3489, Mar. 2003, 44 pgs.
Schulzrinne, H., et al., "RTP, A Transport Protocol for Real-Time Applications," Network Working Group RFC3550, Jul. 2003, 98 pages.
Smith, Bradley R., et al., "Securing the Border Gateway Routing Protocol," Global Telecommunications Conference, Nov. 18-22, 1996.
Townsley, et al., "Layer Two Tunneling Protocol, L2TP," Network Working Group, RFC 2661, Aug. 1999, 75 pages.
Ullman, R., "Rap: Internet Route Access Protocol," RFC 1476, Jun. 1993.
Viswanathan et al., "ARIS: Aggregate Route-Based IP Switching," Internet Draft, Mar. 1997.
Wang, Q. et al., "TCP-Friendly Congestion Control Schemes in the Internet," National Key Lab of Switching Technology and Telecommunication Networks, Beijing University of Posts & Telecommunications; 2001, pp. 211-216; http://www.sics.se/~runtong/11.pdf.
USPTO May 24, 2013 RCE Response to Final Office Action dated Feb. 27, 2013 from U.S. Appl. No. 12/941,881.
USPTO May 24, 2013 Supplemental Response to Final Office Action dated Feb. 27, 2013 from U.S. Appl. No. 12/941,881.
USPTO Jun. 14, 2013 Notice of Allowance from U.S. Appl. No. 12/941,881.
USPTO May 8, 2013 Final Office Action from U.S. Appl. No. 13/160,957.
USPTO Jan. 14, 2014 Notice of Allowance from U.S. Appl. No. 13/152,200.
USPTO Oct. 30, 2013 Notice of Allowance from U.S. Appl. No. 13/077,828.
USPTO Feb. 19, 2014 Notice of Allowance from U.S. Appl. No. 12,938,237.
USPTO May 9, 2014 Notice of Allowance from U.S. Appl. No. 13/160,957.
U.S. Appl. No. 12/941,881, filed Nov. 8, 2010, entitled "System and Method for Providing a Loop Free Topology in a Network Environment," Inventor: Shekher Bulusu.
U.S. Appl. No. 12/938,237, filed Nov. 2, 2010, entitled "System and Method for Providing Proactive Fault Monitoring in a Network Environment," Inventor(s): Chandan Mishra, et al.
U.S. Appl. No. 12/916,763, filed Nov. 1, 2010, entitled "Probing Specific Customer Flow in Layer-2 Multipath Networks," Inventor(s): Chandan Mishra et al.
U.S. Appl. No. 12/658,503, filed Feb. 5, 2010, entitled "Fault Isolation in Trill Networks," Inventor(s): Ali Sajassi et al.
Wikipedia, "IEEE 802.1ag," Connectivity Fault Management, retrieve and printed Nov. 2, 2010, 4 pages; http://en.wikipedia.org/wiki/IEEE_802.1ag.
G. Malkin, "Traceroute Using an IP Option," Network Working Group, RFC 1393, Jan. 1993, 8 pages; http://tools.ietf.org/pdf/rfc1393.pdf.
K. Kompella and G. Swallow, "Detecting Multi-Protocol Label Switched (MPLS) Data Plane Failures," Network Working Group, RFC 4379, Feb. 2006, 52 pages; http://tools.ietf.org/pdf/rfc4379.pdf.
PCT "International Preliminary Report on Patentability, Date of Issuance Jan. 20, 2009 (1 page), Written Opinion of the International (56) References Cited

OTHER PUBLICATIONS

Searching Authority, Date of Mailing Feb. 7, 2008 (6 pages) and International Search Report, Date of Mailing Feb. 7, 2008 (2 pages)," for PCT/US2007/015506.

PCT "International Preliminary Report on Patentability (dated Jan. 26, 2010; 1 page) and Written Opinion of the International Searching Authority and International Search Report (dated Oct. 2, 2008; 7 pages)," for PCT International Application PCT/US2008/070243.

IEEE Standards Department, "Virtual Bridged Local Area Networks—Amendment 6: Provider Backbone Bridges—IEEE P802.1ah/D4.2," © 2008, Institute of Electrical and Electronics Engineers, Inc., Mar. 26, 2008; 116 pages.

* cited by examiner

SYSTEM AND METHOD FOR MANAGING TOPOLOGY CHANGES IN A NETWORK ENVIRONMENT

TECHNICAL FIELD

This disclosure relates in general to the field of communications and, more particularly, to managing topology changes in a network environment.

BACKGROUND

Ethernet architectures have grown in complexity in recent years. This is due, at least in part, to diverse technologies that have emerged to accommodate a plethora of end users. For example, Data Center Ethernet (DCE) represents an extension to Classical Ethernet (CE), and it can offer a lower cost, lower latency, high-bandwidth configuration. The forwarding methodology adopted by DCE networks is generally scalable and, further, provides forwarding paths with equal-cost multipathing with support for different forwarding topologies. In certain network scenarios, topology information may not be current, accurate, and/or consistent. Optimally managing changes in network topologies presents a significant challenge to system designers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a spanning tree protocol topology change notification (STP TCN) in a network; removing topology data for a first plurality of gateways associated with a first network segment ID that is shared by a particular gateway that communicated the STP TCN; and communicating an edge TCN to a second plurality of gateways associated with a second network segment ID and for which topology data has not been removed based on the STP TCN.

In more specific implementations, the network includes a Data Center Ethernet (DCE) network, a first Classical Ethernet (CE) network, and a second CE network, which collectively form a layer-2 (L2) domain. The method can further include executing an intermediate system to intermediate system (IS-IS) protocol on a first set of network links in the network; and executing a spanning tree protocol (STP) on a second set of network links in the network. In yet other embodiments, removing of the topology data comprises removing Media Access Control (MAC) addresses from a MAC table, where the first and second network segment IDs are encoded in respective MAC addresses.

In more detailed instances, the edge TCN contains a generate bit, which causes a receiving network element to remove MAC addresses learned from a communicating network element that provided the edge TCN. Furthermore, the edge TCN can contain a propagate bit, where a receiving network element processes the edge TCN if it belongs to a same CE segment and removes MAC addresses on STP designated ports. A manual configuration mechanism can be used to associate the network segment IDs with respective gateways. Alternatively, STP hello messages can be used to associate the network segment IDs with respective gateways.

Example Embodiments

Figure 1:
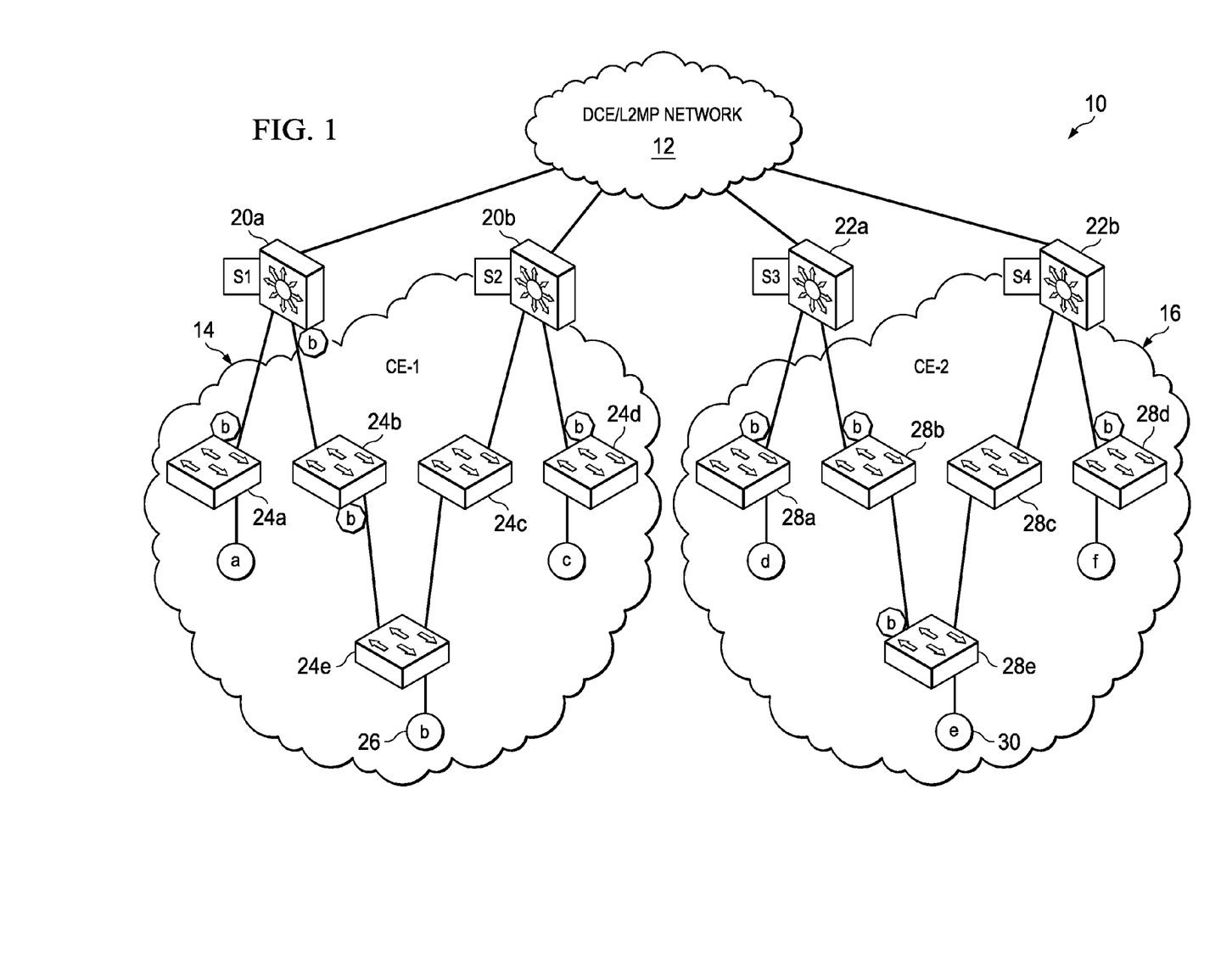
FIG. 1 is a simplified schematic diagram of a communication system for managing topology changes in a network environment in accordance with one embodiment of the present disclosure.

Turning to FIG. 1, FIG. 1 is a simplified block diagram of a communication system 10 for managing topology changes in a network environment in accordance with one embodiment. FIG. 1 may include a Data Center Ethernet (DCE) network segment 12, a Classical Ethernet (CE) network segment 14 (e.g., CE-1) and a CE network segment 16 (e.g., CE-2). Additionally, FIG. 1 may include a set of CE-DCE gateway switches 20a-b operating in DCE network segment 12 and CE-1 network segment 14, along with a set of CE-DCE gateway switches 22a-22b operating in DCE network segment 12 and CE-2 network segment 16. Further, FIG. 1 may include a plurality of CE switches 24a-e operating in CE-1 network segment 14 and a plurality of CE switches 28a-e operating in CE-2 network segment 16. Although CE-1 network segment 14 and CE-2 network segment 16 are a part of the same communication system 10, each is an independent CE cloud using an independent forwarding protocol. That is, in this example implementation, network elements within CE-1 are not directly linked to any network elements within CE-2.

DCE network segment 12, CE-1 network segment 14, and CE-2 network segment 16 represent a series of points or nodes of interconnected communication paths for receiving and transmitting packets of information that propagate through communication system 10. These networks offer a communicative interface between network elements (e.g., switches, bridges, gateways, etc.) and may be any IP network, local area network (LAN), virtual LAN (VLAN), wireless LAN (WLAN), metropolitan area network (MAN), wide area network (WAN), extranet, Intranet, virtual private network (VPN), or any other appropriate architecture or system that facilitates communications in a network environment. The networks can support a transmission control protocol (TCP)/IP, or a user datagram protocol (UDP)/IP in particular embodiments of the present disclosure; however, these networks may alternatively implement any other suitable communication protocol for transmitting and receiving data packets within communication system 10.

CE switches 24a-e and 28a-e, and CE-DCE gateway switches 20a-b and 22a-b are network elements that route (or that cooperate with each other in order to route) traffic and/or packets in a network environment. As used herein in this Specification, the term 'network element' is used interchangeably with the term 'gateway' and these terms are meant to encompass switches, routers, bridges, loadbalancers, firewalls, inline service nodes, proxies, servers, processors, modules, or any other suitable device, component, element, or object operable to exchange information in a network environment. The network elements may include any suitable hardware, software, components, modules, interfaces, or objects that facilitate the operations thereof. This may be inclusive of appropriate algorithms and communication protocols that allow for the effective exchange (reception and/or transmission) of data or information.

DCE networks commonly use a routing protocol (e.g., intermediate system to intermediate system (IS-IS)) for forwarding purposes, where CE networks commonly use a spanning tree protocol (STP) as their forwarding protocol. DCE and CE may form the same layer-2 (L2) domain. Loop prevention within hybrid CE-DCE networks operating different forwarding protocols is an important issue. One example of a network protocol ensuring loop-free hybrid CE-DCE networks is the L2 Gateway Spanning Tree Protocol (L2G-STP), as discussed in pending U.S. patent application having Ser. No. 12/941,881 and entitled "SYSTEM AND METHOD FOR PROVIDING A LOOP FREE TOPOLOGY IN A NETWORK ENVIRONMENT" which is incorporated in its entirety into this Specification. An aspect of loop prevention within a network implicates the availability of network elements. Thus, a mechanism is needed to efficiently and effectively manage changes in topology within a CE network portion of a hybrid CE-DCE network.

Returning to FIG. 1, in one particular example, DCE network segment 12 is representative of a L2 multi-pathing (L2MP) network, which may be executing the IS-IS forwarding protocol. CE-DCE gateway switches 20*a-b* and 22*a-b* can be employing the IS-IS protocol on DCE links, and using STP on the CE links. In this particular configuration of FIG. 1, CE switches 24*a-e* and 28*a-e* may be executing an STP. Further, as none of the switches in CE-1 network segment 14 (e.g., CE switches 24*a-e*) are directly connected to any switches in CE-2 network segment 16 (e.g., CE switches 28*a-e*), CE-1 and CE-2 may execute the STP.

Note that before turning to the example flows and infrastructure of example embodiments of the present disclosure, a brief overview of the switching environment is provided for purposes of context and explanation. Link state routing is a protocol that allows a node in a network to determine network topology by sharing information about transmission cost to each of its neighboring nodes. Link state routing packets are transmitted to (and received from) neighbors. The least expensive path to various destinations can be determined using the link state information. Link state information can be used to generate network topology information at various network nodes for creating forwarding tables. The forwarding tables allow network nodes (such as switches and bridges) to forward the received traffic on an appropriate output interface. In order to generate a network topology map and a forwarding table at a specific node, link state information is distributed from various network nodes. Each network node is configured to create a link state packet having information about the distance, delay, or cost to each of its neighbors. A link state record (LSR) can then be transmitted to neighboring nodes.

Transient loops arise when network topology changes because neighboring nodes may not be forwarding transmissions using the same generated network topology. Transient and permanent loops waste network bandwidth and, further, may burden end nodes with duplicate copies of topology information. One mechanism for preventing loops is STP. STP commonly runs on a switch and, further, operates to maintain a loop-free topology in an L2 switched network. The term spanning tree protocol (STP) as used herein includes any version of STP, including for example, traditional STP (IEEE 802.1d), rapid spanning tree protocol (RSTP) (IEEE 802.1w), multiple spanning tree protocol (MSTP) (IEEE 802.1s), or any other spanning tree protocol. CE switches may use STP to prevent loops, whereas other devices such as DCE switches may be configured to use protocols other than STP (e.g., IS-IS) to provide loop-free operations. While STP and other protocols work well for a standalone network comprising switches that utilize one protocol for preventing loops, the different protocols may not interoperate with each other and, therefore, cannot effectively be used in a combined (i.e., a hybrid) network.

FIG. 1 depicts clouds that form a switching network, where a cloud is defined as a set of one of more network switches/bridges and end hosts: all of which may be interconnected. At the edge of a DCE cloud and a CE cloud, a model for control plane interaction between the two clouds is commonly defined. Specifically, DCE and CE use different protocols to construct their respective forwarding topology (IS-IS versus STP). Thus, even though a single L2 domain would span the clouds, two different protocols govern the determination of the forwarding topology. One immediate issue surfaces as to how a change of topology (e.g., a link failure) in one cloud (e.g., CE-1 network segment 14) is managed in the other two clouds (e.g., DCE network segment 12 and CE-2 network segment 16). Updating network elements after a change in topology can create a significant increase in traffic, as new link state information needs to be communicated and forwarding tables need to be adjusted. The increased traffic can waste bandwidth and burden network elements.

For example, in regards to the example of FIG. 1, a change in the topology (e.g., a change in the availability of a network element) of segment CE-1 network segment 14 would need to be to be reported and managed throughout the hybrid CE-DCE network, including for DCE segment 12 and for CE-2 network segment 16. In CE networks executing STP forwarding protocols, network elements recognizing a change in topology (e.g., a link failure) propagate an STP topology change notification (TCN) to other network elements within the CE network. Upon receiving an STP TCN, each CE network element updates or relearns the topology of the network. The network elements continue to propagate STP TCNs until the network elements have been updated and, therefore, contain the same understanding of the CE network topology.

In hybrid CE-DCE networks, topology changes within one network segment (e.g., CE-1 network segment 14) do not need to be addressed in other network segments (e.g., DCE network segment 12 and CE-2 network segment 16) in the same manner as in the network segment that experiences the change. To optimize the handling of a topology change, it becomes important to minimize needless link state information from being communicated and to update the forwarding tables of network elements impacted by the topology change.

In accordance with the teachings of the present disclosure, communication system 10 addresses the aforementioned shortcomings (and others) in optimally managing topology changes. In logistical terms, the general approach of communication system 10 is to assign each L2 gateway switch (i.e., an L2 switch connected to CE and L2MP) with an L2 gateway domain ID. This can be accomplished through user configuration, where by default, the L2 gateway switches belong to the STP domain ID. This information of the L2 gateway domain ID can be encoded in an L2G-STP reserved MAC address and, subsequently, flooded to the L2 gateway switches using the L2MP IS-IS protocol. Note that a block of 1000 MAC addresses is generally reserved for the L2G-STP protocol.

Hence, the L2G switches would then have the information of the L2 gateway switches, along with their associated domain ID before certain activities occur in the network.

Therefore, whenever an L2 gateway switch receives an STP TCN, it can flush the learned MAC addresses on designated ports. This network element is configured to then generate an edge TCN using the IS-IS protocol. For example, when an L2 gateway switch receives an edge TCN (where the message includes the sender switch ID), it can identify the switches belonging to the same L2 gateway domain as the sender switch. The network element is configured to then flush the MAC addresses learned from those switches. In addition, if the edge TCN were different from the L2 gateway domain ID, then it would not send the STP TCN in its CE cloud.

Note that such an approach may (in certain circumstances) shift responsibility to a customer to configure STP domain IDs based on the L2 network topologies. In order to address the case where there is connectivity between two L2 gateway domains, the architecture can employ an L2 gateway domain discovery protocol, which can send messages in the CE cloud to detect its peer L2 gateway switches. This optional feature can be provided based on particular configuration environments, or particular operator needs. Details relating to the possible signaling and interactions between the components of communication system 10 are provided below with reference to FIGS. 2A-4.

Figure 2A:
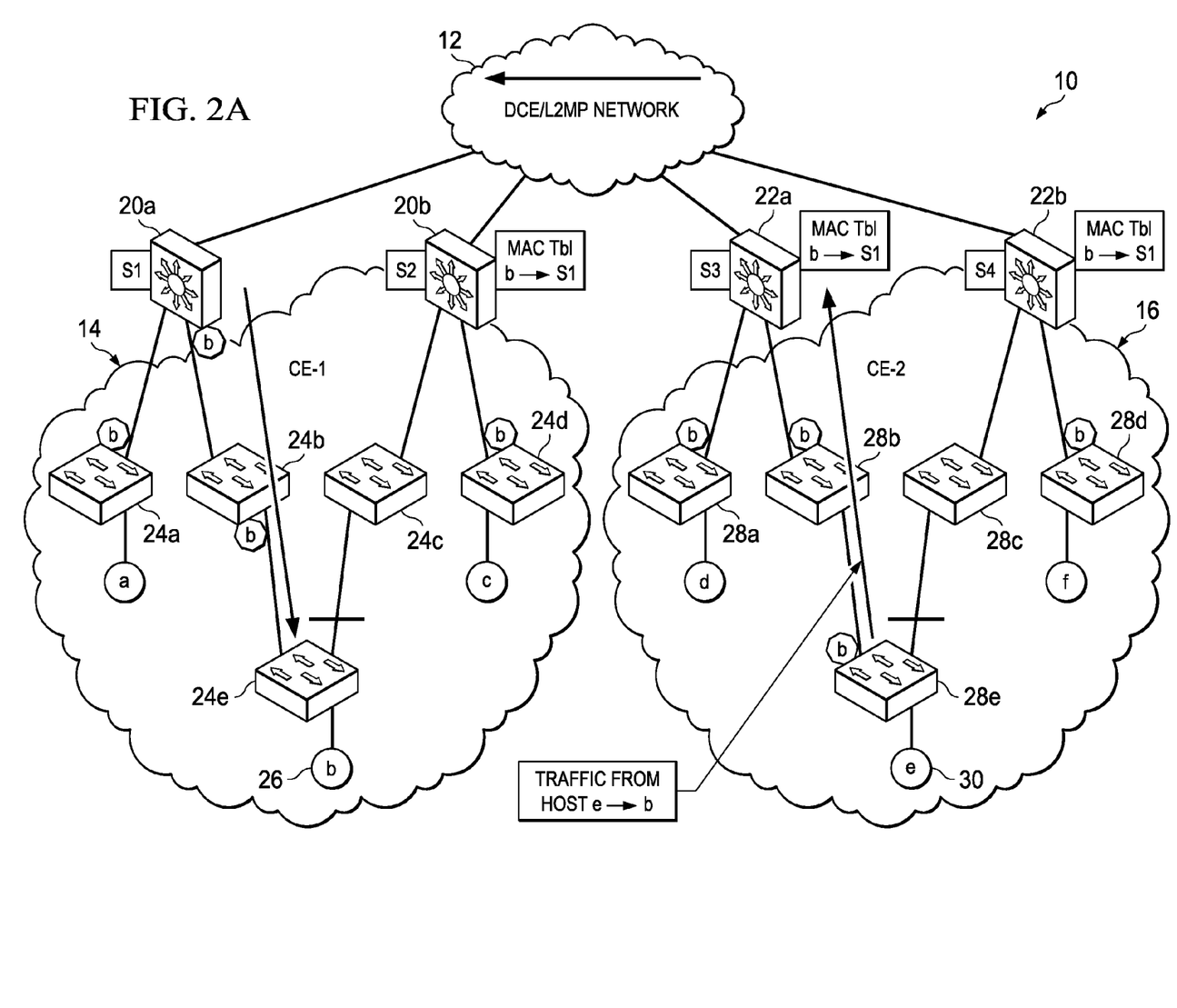
FIGS. 2A-E are simplified schematic diagrams illustrating details related to example implementations of the communication system in accordance with one embodiment.

Turning to FIGS. 2A-2E, these FIGURES illustrate example topology change management activities associated with communication system 10. FIGS. 2A-2E reflect example flows for particular topology change events and, therefore, these related illustrations are discussed together. Note that the term 'topology data' as used herein in this Specification is meant to include any information relating to network elements and/or network characteristics (e.g., port information, MAC address information, configuration data, etc.). FIG. 2A illustrates one example path that data information can travel from host 'e' 30 in CE-2 network segment 16 to host 'b' 26 in CE-1 network segment 14. Data information may travel within CE-2 network segment 16 from host 'e' 30 to a CE switch 28e, then from CE switch 28e to another CE switch 28b, and finally from CE switch 28b to CE-DCE gateway switch S3 22a (as indicated by the arrow of FIG. 2A). CE-DCE gateway switch S3 22a may communicate data information from host 'e' 30 into DCE network segment 12 (as indicated by the arrow).

CE-DCE gateway switch S1 20a is configured to receive data information from host 'e' 30 in CE-2 network segment 16. CE-DCE gateway switch S1 20a may communicate the data from host 'e' 30 to CE switch 24b, which may communicate the data information to another CE switch 24e, which in turn communicates the data information to host 'b' 26 (as indicated by the arrow of FIG. 2A). Thus, in the example in FIG. 2A, data information communicated from host 'e' 30 to host 'b' 26 travels the path of: host 'e' 30 to CE switch 28e, to CE switch 28b, to CE-DCE gateway switch S3 22a, into DCE network segment 12, to CE-DCE gateway switch S1 20a, to CE switch 24b, to CE switch 24e, and finally to host 'b' 26. Each MAC address table for CE-DCEs S2 20b, S3 22a, and S4 22b may include table entries indicating that data information addressed to host 'b' 26 should be transmitted through CE-DCE gateway switch S1 20a.

CE-DCE gateway switches are configured to learn the CE network segment they are operating in (e.g., CE-1 network segment 14 or CE-2 network segment 16). A CE-DCE gateway switch may learn which CE network it operates in by manual configuration before deployment of the network element in the hybrid CE-DCE network. A network administrator may assign each CE-DCE gateway switch a domain identifier (ID), which can be any suitable data segment that can distinguish domains. By default, each CE-DCE gateway switch could be part of domain ID 1. The CE domain ID may be encoded in a reserved MAC address (e.g., a block of MAC addresses reserved in L2G-STP). A CE-DCE gateway switch may communicate the CE domain ID [to which it is associated] to other CE-DCE gateway switches through DCE network segment 12 using IS-IS. Another method of associating CE-DCE gateway switches with a CE domain ID is to have CE-DCE gateway switches communicate an STP hello message from ports operating in the CE network segment. STP hello messages transmitted in a CE network segment (e.g., CE-1 network segment 14 or CE-2 network segment 16) enable other CE-DCE gateway switches to know they are operating in the same network (e.g., the same CE network).

Figure 2B:
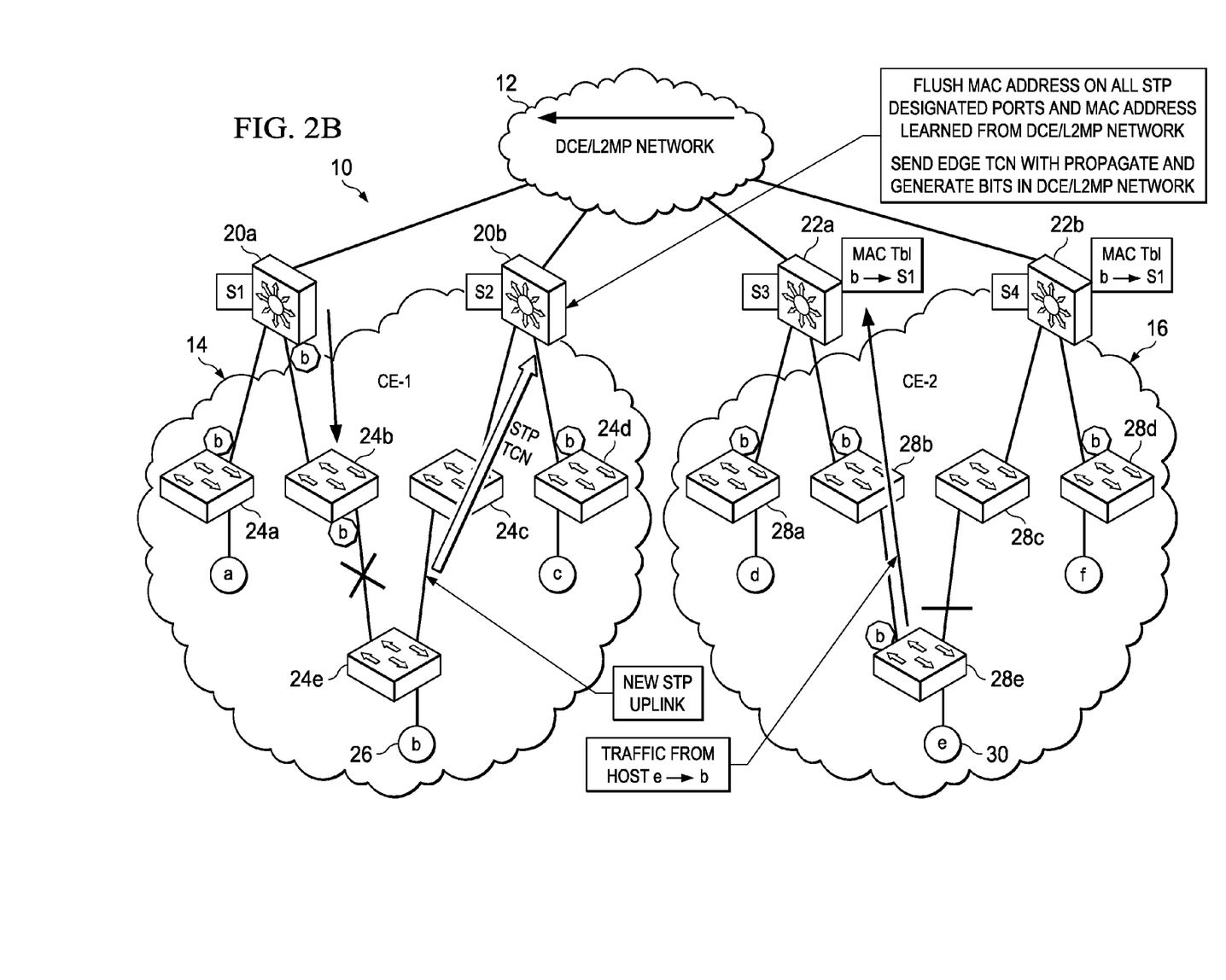
Figure 2C:
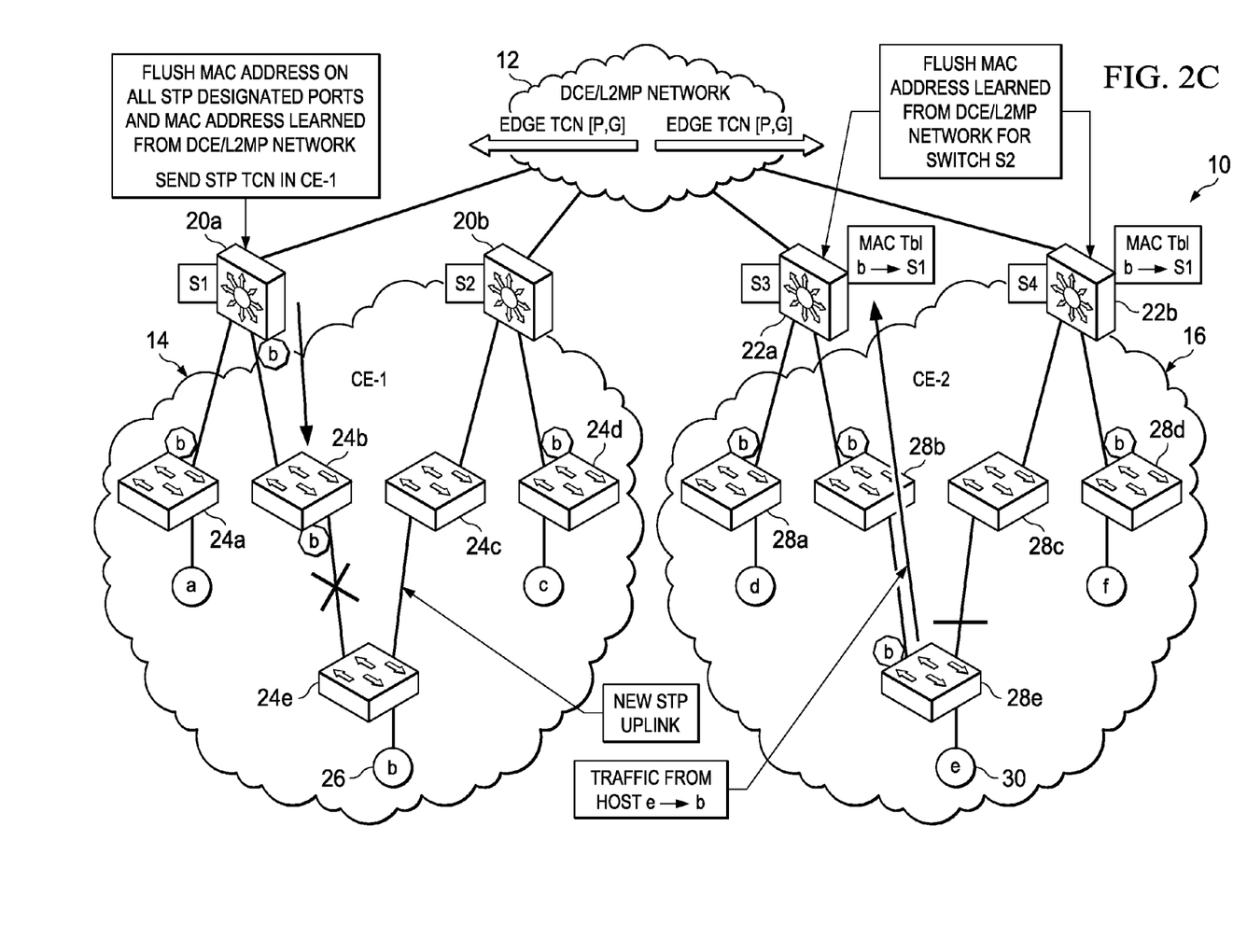

FIG. 2B is a simplified schematic diagram illustrating the development of a topology change in communication system 10. In this particular example, a link failure develops between CE switch 24b and CE switch 24e, as indicated by the 'X'. Once the link failure occurs, data information traveling from host 'e' 30 to host 'b' 26 can no longer reach its destination. CE switch 24e may recognize the link failure and determine a new network path to host 'b' 26 (e.g., using link state information). When a CE switch identifies a new path to host 'b', it communicates an STP topology change notification (TCN). In one example, CE switch 24e determines that the new path to host 'b' 26 can propagate through CE switch 24c and CE-DCE gateway switch S2 20b (e.g., a new STP uplink). CE switch 24e transmits an STP TCN into CE-1 network segment 14 onto the link between itself and CE switch 24c. The port associated with that link can change from a blocking port to a forwarding port. Upon receiving an STP TCN, CE switch 24c may flush its MAC address table of the MAC addresses, and communicate an STP TCN towards CE-DCE gateway switch S2 20b. CE-DCE gateway switch S2 20b may receive the STP TCN and flush its MAC address table of the MAC addresses it learned from STP ports (e.g., any MAC addresses learned from network elements in CE-1). CE-DCE gateway switch S2 20b further removes (from its MAC table) the MAC addresses learned from ports connected to DCE network segment 12. Moreover, upon receiving an STP TCN, CE-DCE gateway switch S2 20b transmits an edge TCN into DCE network segment 12 (as illustrated in FIG. 2C). The edge TCN may include generate and propagate bits, as well as the domain ID of the CE-DCE gateway switch that sent the edge TCN (i.e., CE-DCE gateway switch S2 20b).

FIG. 2C is a simplified schematic diagram that depicts an example topology change in communication system 10. An edge TCN sent by CE-DCE S2 20b may be transmitted through DCE network segment 12 using IS-IS, eventually reaching a plurality of CE-DCE gateway switches. CE-DCE gateway switches associated with the same network segment ID as CE-DCE gateway switch S2 20b (e.g., S1 20a) may process edge TCNs if the propagate bit is set. CE-DCE gateway switch S1 20a may remove (from its internally stored MAC tables) the MAC addresses for the STP designated ports (e.g., ports attached to CE-1 network segment 14) and the MAC addresses learned from DCE network segment 12. Essentially, CE-DCE gateway switch S1 20a flushes the MAC addresses in its MAC table. CE-DCE S1 20a further communicates an STP TCN on the ports connected to CE-1 network segment 14 (e.g., the STP designated ports). Moreover, CE-DCE gateway switch S1 20a may transmit an edge TCN into DCE network segment 12 with the generate bit set (as explained further below).

Returning to FIG. 2C, CE-DCE gateway switches not associated with the same network ID as CE-DCE S2 20b can process an edge TCN with a generate bit set in this example. Upon receiving an edge TCN from CE-DCE gateway switch S2 20b with the generate bit set, CE-DCE gateway switches S3 22a and S4 22b may remove from their respective MAC address tables the MAC addresses learned from the network element that sent the edge TCN (i.e., S2). Because CE-1 and CE-2 are separate CE domains (i.e., no network elements in CE-1 and CE-2 are directly connected), a change in topology of CE-1 network segment 14 does not require the network elements within CE-2 network segment 16 to transmit an STP TCN. Therefore, CE-DCE gateway switches S3 22a and S4 22b do not flush their MAC tables of the MAC addresses, and do not send STP TCNs into CE-2 network segment 16, thereby minimizing sub-optimal handling of a topology change within CE-1. Flooding a CE network segment with STP TCNs creates significant amounts of overhead traffic for the network elements to process. Further, by flushing the MAC addresses learned from CE-DCE gateway switches that send out the edge TCNs with generate bits set, the CE-DCE gateway switches do not have to relearn the topology of the hybrid communication system (e.g., update the MAC addresses in their MAC tables). It is beneficial for CE-DCE gateway switches S3 22a and S4 22b to relearn the MAC addresses learned from CE-DCE gateway switch S2 20b. Minimizing MAC table flushing within CE-DCE gateway switches and reducing needless STP TCNs optimizes the time and resources necessary to manage topology changes in the hybrid CE-DCE communication system.

Figure 2D:
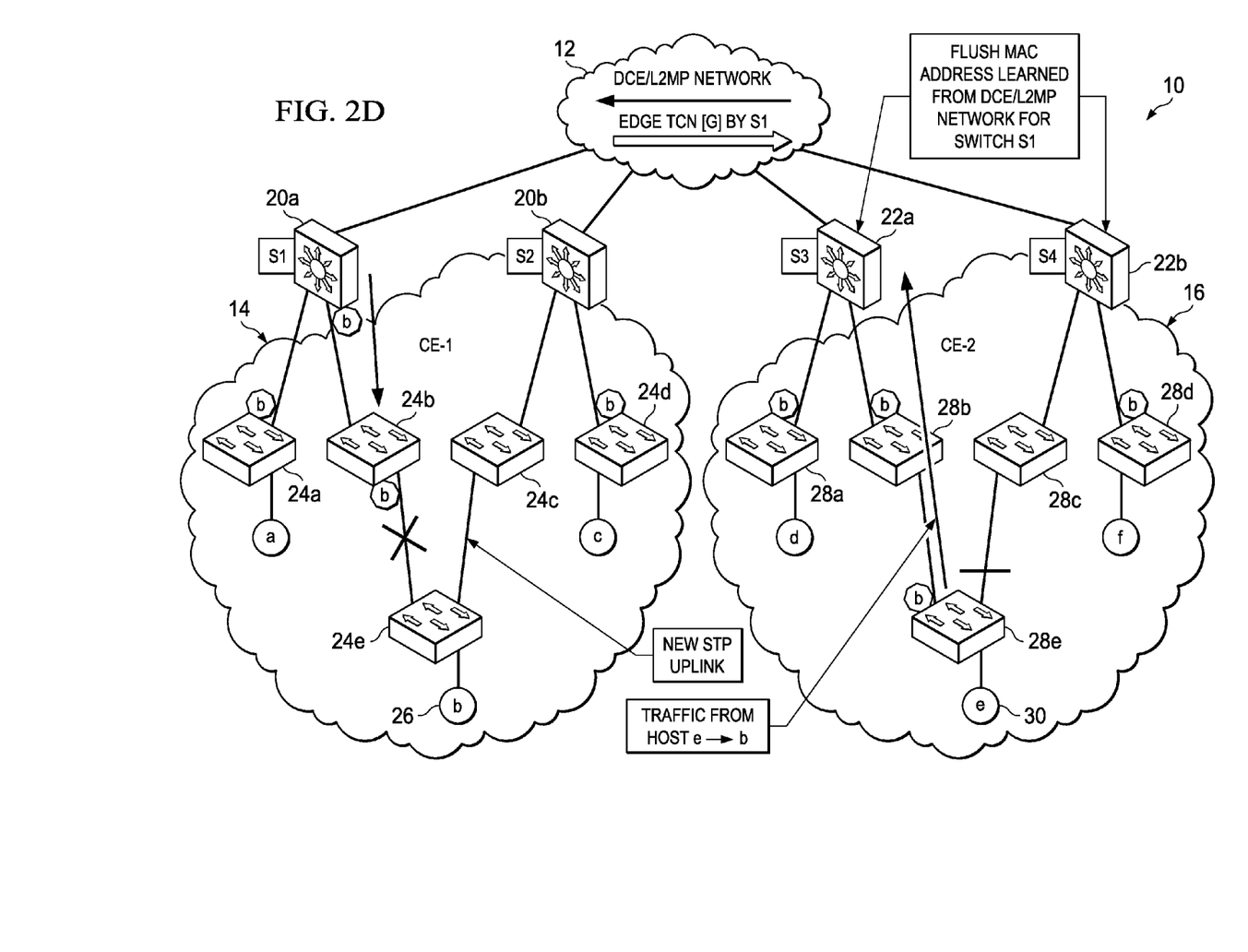

FIG. 2D is a simplified schematic diagram, which continues to illustrate a change of topology within communication system 10. As noted above, upon receiving an edge TCN from a CE-DCE gateway switch with the same network segment ID (i.e., S1), CE-DCE gateway switch S1 20a transmits an edge TCN into DCE network segment 12 with a generate bit set. Similar to the process described in FIG. 2C, when CE-DCE gateway switches S3 22a and S4 22b receive edge TCNs with a generate bit set from CE-DCE gateway switches that do not have the same network segment ID, they remove (from their respective MAC tables) the MAC addresses learned from the CE-DCE gateway switch that sent the edge TCN. Similar to above, by not flushing the MAC addresses in their MAC tables and by not transmitting STP TCNs within CE-2 network segment 16, CE-DCE gateway switches S3 22a and S3 22b minimize inefficient STP TCN propagation in CE-2 that would otherwise waste network bandwidth. Further, by flushing the MAC addresses learned from CE-DCE gateway switch S1 20a, CE-DCE gateway switches S3 22a and S4 22b relearn the MAC addresses learned from S1 20a. That is, CE-DCE gateway switches S3 22a and S4 22b do not have to relearn the topology of the hybrid communication system.

Figure 2E:
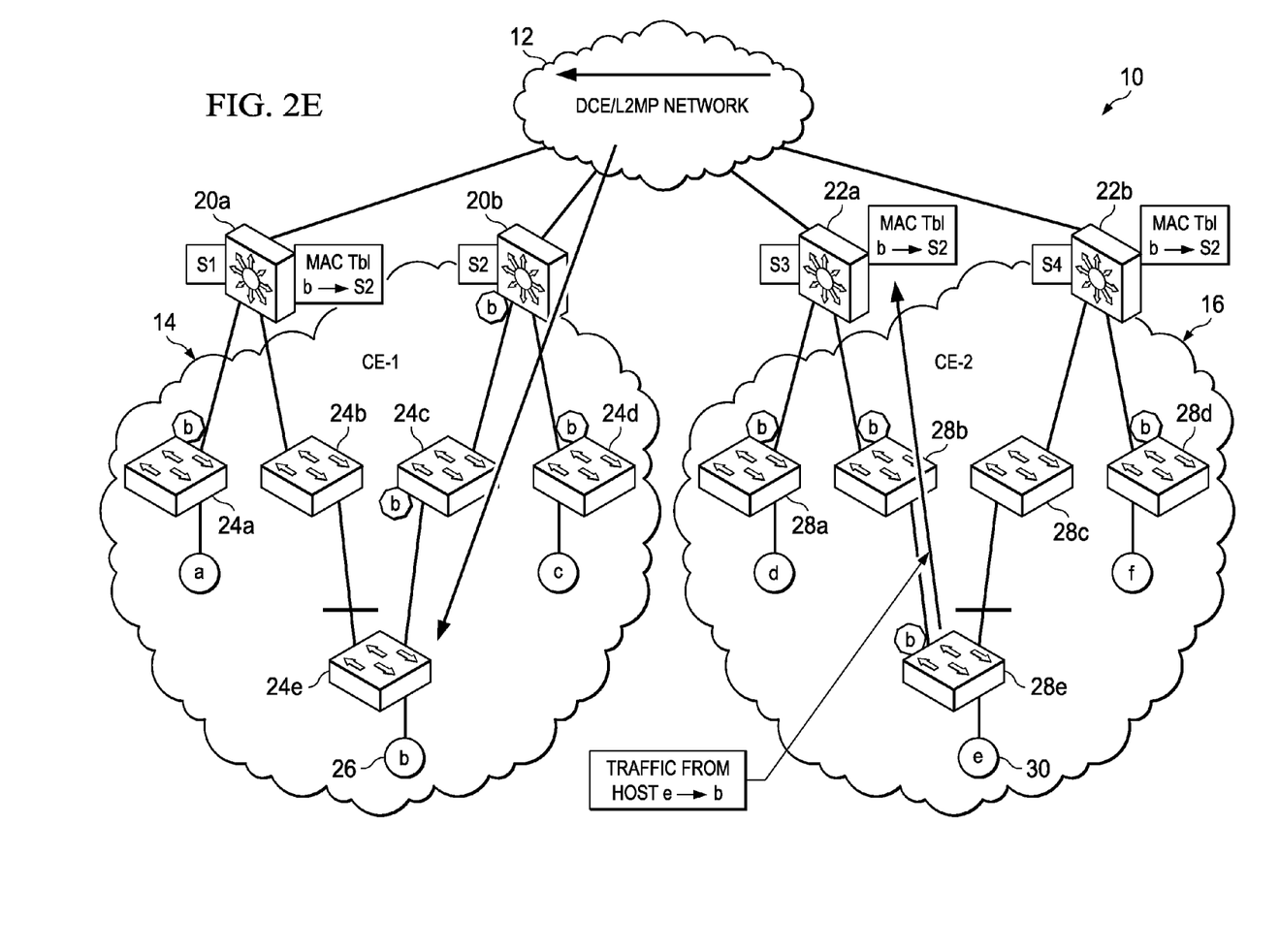

FIG. 2E is a simplified schematic diagram, which continues to illustrate an example of a change in topology of communication system 10. After flushing their respective MAC tables, CE-DCE gateway switches S1 20a, S3 22a, and S4 22b learn that data information addressed to host 'b' 26 propagates through CE-DCE gateway switch S2 20b. As illustrated in FIG. 2E, after the change in topology (e.g., a failed link), data information sent from host 'e' 30 to host 'b' 26 still travels through CE switch 28e, CE switch 28b, CE-DCE gateway switch S3 22a, and into DCE network segment 12 (as indicated by the arrows). Because there was no topology change within DCE network segment 12 and CE-2 network segment 16, data information from host 'e' 30 to host 'b' 26 follows the same path through CE-2 network segment 16 and DCE network segment 12. However, traffic from host 'e' 30 to host 'b' 26 now travels from DCE network segment 12 through CE-DCE gateway switch S2 20b, to CE switch 24c, to CE switch 24e, and finally to host 'b' 26 (as indicated by the arrow).

As indicated in FIG. 2E, the respective MAC tables of CE-DCE gateway switches S1 20a, S3 22a, and S4 22b include entries that indicate that data information addressed to host 'b' 26 should be transmitted through CE-DCE gateway switch S2 20b. Thus, FIGS. 2A-2E illustrate a method of efficiently and effectively managing a topology change in a CE network segment of a hybrid CE-DCE network and that does not require CE-DCE gateway switches associated with different CE network segments to needlessly flush their respective MAC addresses, and flood their respective CE network segments with STP TCNs.

Figure 3:
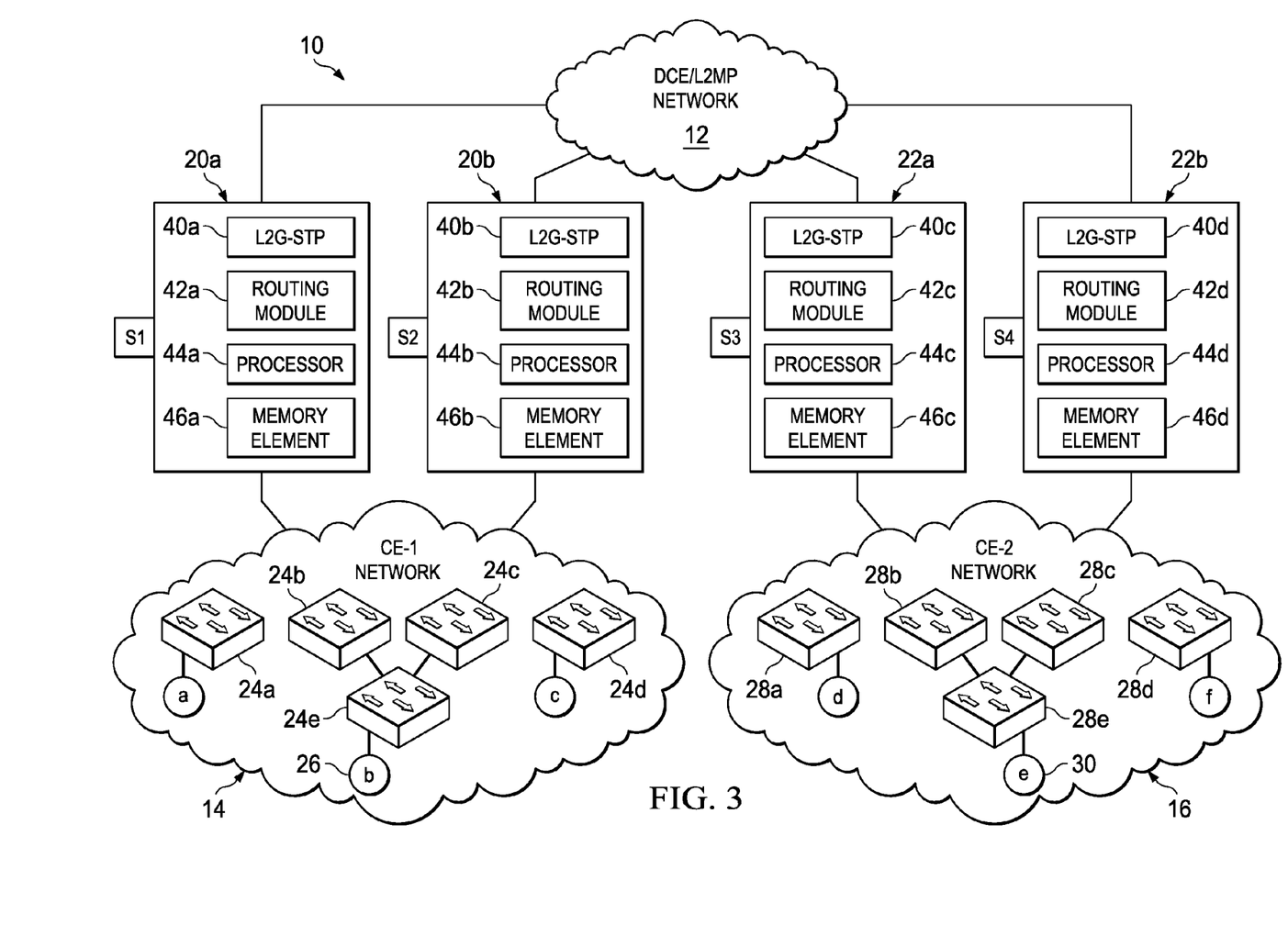
FIG. 3 is a simplified schematic diagram illustrating additional details related to the communication system in accordance with one embodiment.

FIG. 3 is a simplified block diagram illustrating potential details associated with communication system 10. In this particular example, CE-DCE gateway switches 20a-b (i.e., S1 and S2) and 22a-b (i.e., S3 and S4) include respective processors 44a-d, respective memory elements 46a-d, respective L2G-STP modules 40a-d, and respective routing modules 42a-d (e.g., IS-IS routing modules). Note also that L2G-STP modules 40a-d and routing modules 42a-d can be part of hybrid configurations in which any of the modules of FIG. 3 are suitably consolidated, combined, removed, added to, etc.

In operation, L2G-STP modules 40a-d may be configured to coordinate topology changes in a CE-DCE hybrid network. The L2G-STP modules 40a-d can learn (or associate with) a network domain ID to which each CE-DCE gateway switch is connected (e.g., operating in). L2G-STP modules 40a-d can coordinate receiving edge and STP TCNs, as well as communicating edge and STP TCNs. Further, L2G-STP modules 40a-d may be configured to facilitate updating MAC address tables stored in memory elements 46a-d to add or to remove MAC addresses. Processors 44a-d may execute code stored in memory elements 46a-d.

Note that CE-DCE switches 20a-b and 22a-b may share (or coordinate) certain processing operations. Using a similar rationale, their respective memory elements may store, maintain, and/or update data in any number of possible manners. In a general sense, the arrangement depicted in FIG. 3 may be more logical in its representations, whereas a physical architecture may include various permutations/combinations/hybrids of these elements. In one example implementation, CE-DCE gateway switches 20a-b and 22a-b include software (e.g., as part of L2G-STP modules 40a-d and/or routing modules 42a-d) to achieve the topology change management activities, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of FIGS. 1-3 may include any suitable algorithms, hardware, software, components, modules, interfaces, or objects that facilitate these topology change management operations.

Figure 4:
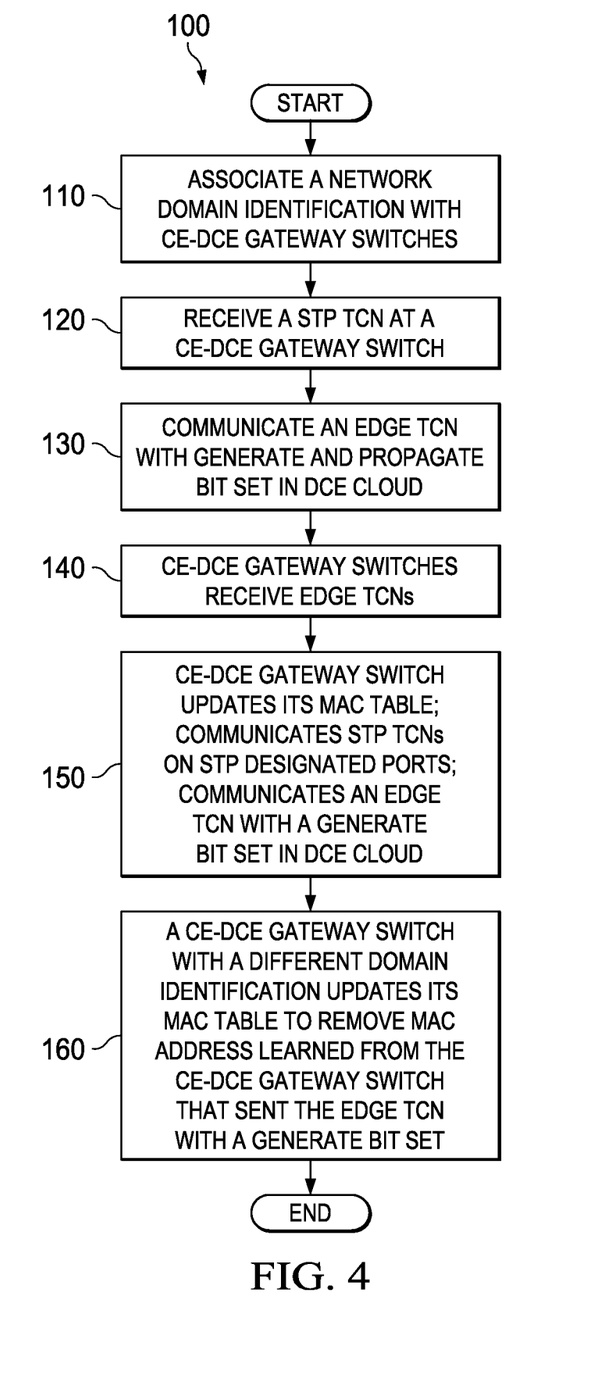
FIG. 4 is a simplified flowchart illustrating a series of example steps for a flow associated with the communication system.

Turning to FIG. 4, FIG. 4 is a simplified flowchart illustrating one example flow 100 that could be accommodated by communication system 10. This particular flow may begin at 110, where a network domain ID is associated with a given set of CE-DCE gateway switches. At 120, an STP TCN can be received at a CE-DCE switch. At 130, an edge TCN is communicated, where this piece of information includes a generate bit and a propagate bit set in the DCE cloud. At 140, the CE-DCE gateway switches receive edge TCNs.

At 150, a CE-DCE gateway switch (having the same domain ID as the CE-DCE gateway switch that sent an edge TCN with a propagate bit set) updates its MAC table. Note that such a table may be provisioned in any given memory element of the gateway. The objective of this operation is to remove the MAC addresses learned from the STP designated ports and the DCE cloud. Additionally at 150, STP TCNs are communicated on STP designated ports. Furthermore, an edge TCN (with a generate bit set in the DCE cloud) is communicated. At 160, a CE-DCE gateway switch with a different domain (in comparison to the CE-DCE gateway that sent an edge TCN with the generate bit set) is configured to update its MAC table to remove MAC addresses learned from the CE-DCE gateway switch that sent the edge TCN with the generate bit set.

Note that in certain example implementations, the topology change management activities outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 3) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 3) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, L2G-STP modules 40*a-d* and/or routing modules 42*a-d* include software in order to achieve the topology change management outlined herein. These activities can be facilitated by CE-DCE gateway switches 20*a-b* and 22*a-b*, and/or any of the elements of FIGS. 1-3. CE-DCE gateway switches 20*a-b* and 22*a-b* can include memory elements for storing information to be used in achieving the intelligent switching control, as outlined herein. Additionally, CE-DCE gateway switches 20*a-b* and 22*a-b* may include a processor that can execute software or an algorithm to perform the switching activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of clouds, networks, and/or switches, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where L2G-STP modules 40*a-d*, and/or routing modules 42*a-d* are provided separately, these modules can be consolidated or combined in any suitable fashion, or provided in a single proprietary unit.

It is also important to note that the steps discussed with reference to FIGS. 1-4 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in networking environments or arrangements, the present disclosure may be used in any communications environment that could benefit from such technology. Virtually any configuration that seeks to intelligently manage network topology changes and/or switch packets could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   receiving a spanning tree protocol topology change notification (STP TCN) in a network;
   removing topology data using an STP for a first plurality of gateways associated with a first network segment ID that is shared by a particular gateway that communicated the STP TCN; and
   communicating an edge TCN over an intermediate system to intermediate system (IS-IS) protocol to a second plurality of gateways associated with a second network segment ID and for which topology data has not been removed based on the STP TCN; and
   removing topology data from the second plurality of gateways that was learned from a communicating network element that communicated the edge TCN without communicating the STP TCN into a second network associated with the second network segment ID.

2. The method of claim 1, wherein the network includes a Data Center Ethernet (DCE) network, a first Classical Ethernet (CE) network, and a second CE network, which collectively form a layer-2 (L2) domain.

3. The method of claim 1, wherein removing the topology data comprises removing Media Access Control (MAC) addresses from a MAC table, and wherein the first and second network segment IDs are encoded in respective MAC addresses.

4. The method of claim 1, wherein the edge TCN contains a generate bit, which causes a receiving network element to remove MAC addresses learned from a communicating network element that provided the edge TCN.

5. The method of claim 1, wherein the edge TCN contains a propagate bit, and wherein a receiving network element processes the edge TCN if it belongs to a same CE segment and removes MAC addresses on STP designated ports.

6. The method of claim 1, wherein a manual configuration mechanism is used to associate the network segment IDs with respective gateways.

7. The method of claim 1, wherein STP hello messages are used to associate the network segment IDs with respective gateways.

8. Logic encoded in non-transitory media that includes code for execution and when executed by a processor operable to perform operations comprising:
receiving a spanning tree protocol topology change notification (STP TCN) in a network;
removing topology data using an STP for a first plurality of gateways associated with a first network segment ID that is shared by a particular gateway that communicated the STP TCN; and
communicating an edge TCN over an intermediate system to intermediate system (IS-IS) protocol to a second plurality of gateways associated with a second network segment ID and for which topology data has not been removed based on the STP TCN; and
removing topology data from the second plurality of gateways that was learned from a communicating network element that communicated the edge TCN without communicating the STP TCN into a second network associated with the second network segment ID.

9. The logic of claim 8, wherein the network includes a Data Center Ethernet (DCE) network, a first Classical Ethernet (CE) network, and a second CE network, which collectively form a layer-2 (L2) domain.

10. The logic of claim 8, wherein removing the topology data comprises removing Media Access Control (MAC) addresses from a MAC table, and wherein the first and second network segment IDs are encoded in respective MAC addresses.

11. The logic of claim 8, wherein the edge TCN contains a generate bit, which causes a receiving network element to remove MAC addresses learned from a communicating network element that provided the edge TCN.

12. The logic of claim 8, wherein the edge TCN contains a propagate bit, and wherein a receiving network element processes the edge TCN if it belongs to a same CE segment and removes MAC addresses on STP designated ports.

13. The logic of claim 8, wherein STP hello messages are used to associate the network segment IDs with respective gateways.

14. An apparatus, comprising:
a memory element configured to store electronic code;
a processor operable to execute instructions associated with the electronic code; and
a routing module configured to interface with the processor such that the apparatus is configured for:
receiving a spanning tree protocol topology change notification (STP TCN) in a network;
removing topology data using an STP for a first plurality of gateways associated with a first network segment ID that is shared by a particular gateway that communicated the STP TCN; and
communicating an edge TCN over an intermediate system to intermediate system (IS-IS) protocol to a second plurality of gateways associated with a second network segment ID and for which topology data has not been removed based on the STP TCN; and
removing topology data from the second plurality of gateways that was learned from a communicating network element that communicated the edge TCN without communicating the STP TCN into a second network associated with the second network segment ID.

15. The apparatus of claim 14, wherein the network includes a Data Center Ethernet (DCE) network, a first Classical Ethernet (CE) network, and a second CE network, which collectively form a layer-2 (L2) domain.

16. The apparatus of claim 14, wherein removing the topology data comprises removing Media Access Control (MAC) addresses from a MAC table, and wherein the first and second network segment IDs are encoded in respective MAC addresses.

17. The apparatus of claim 14, wherein the edge TCN contains a generate bit, which causes a receiving network element to remove MAC addresses learned from a communicating network element that provided the edge TCN.

18. The apparatus of claim 14, wherein the edge TCN contains a propagate bit, and wherein a receiving network element processes the edge TCN if it belongs to a same CE segment and removes MAC addresses on STP designated ports.

19. The apparatus of claim 15, wherein STP hello messages are used to associate the network segment IDs with respective gateways.

* * * * *